Dec. 15, 1931.  W. A. MATHESON  1,836,263
CASTER
Filed Dec. 12, 1927

Witness:
William P. Kilroy

Inventor:
William A. Matheson
By Hill & Hill
Attys

Patented Dec. 15, 1931

1,836,263

UNITED STATES PATENT OFFICE

WILLIAM A. MATHESON, OF CHICAGO, ILLINOIS, ASSIGNOR TO ROLL-A-WAY BED CORPORATION, OF CHICAGO, ILLINOIS, A CORPORATION OF ILLINOIS

CASTER

Application filed December 12, 1927. Serial No. 239,479.

My invention relates to casters, and more particularly to casters provided with anti-friction bearings and a method of producing the same.

A particular object of the invention is to provide devices of the kind described which are so constructed that the parts thereof can be quickly and easily assembled.

Another particular object of the invention is to provide improved means for securing an anti-friction bearing in a caster.

Still another particular object of the invention is to provide a caster which is of a compact and strong construction.

Still another object of the invention is to provide an improved method for securing an anti-friction bearing member to a metal stamping.

Many other objects and advantages of the construction herein shown and described will be obvious to those skilled in the art from the disclosure herein given.

To this end my invention consists in the novel construction, arrangement and combination of parts herein shown and described, and more particularly pointed out in the claim.

In the drawings, wherein like reference characters indicate like or corresponding parts:

Figure 1:
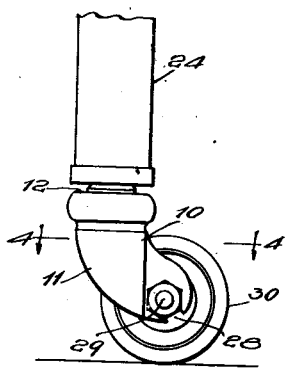
Fig. 1 is a side elevation of a caster which embodies the invention, the caster being shown in connection with an element which is supported thereby.
Figure 2:
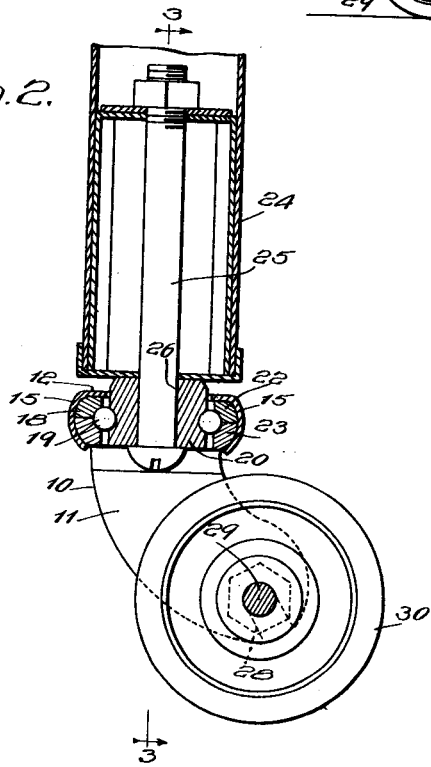
Fig. 2 is a vertical central section taken through the caster shown in Fig. 1.
Figure 3:
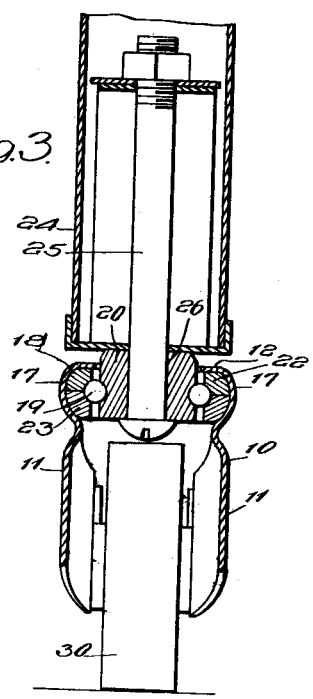
Fig. 3 is a section taken on line 3—3 of Fig. 2.

Referring to the drawings in which I have shown a preferred form of the invention embodied in a caster, the reference character 10 designates generally a bracket or a fork member which preferably comprises two side legs 11, the side legs 11 being preferably connected at their upper ends by an integral cross piece or flange member 12. Referring to Fig. 2, it will be noted that the cross piece or flange member 12 is provided with downwardly extending arcuate flanges 15 intermediate the side legs or members 11 and that these flanges 15 are formed integral with the cross piece or flange 12 and with the side members 11. The upper ends of the side members 11 are curved as at 17 to form continuations of the flanges 15, the construction being such that the curved portions 17 of the side members 11 cooperate with the flanges 15 to hold the outer race 18 of a ball bearing 19 which also comprises an inner race 20. The outer race 18 preferably comprises a plurality of annular members 22 and 23, each of which has a portion of the race-way formed therein. It may be mentioned that the ball bearing 19 is a combined thrust and radial bearing.

The inner race 20 of the ball bearing 19 may be secured by any suitable means to the article which the caster is to carry. Thus, the inner race 20 may be secured to an element 24 by means comprising a bolt 25, or the equivalent, which passes through a central aperture 26 formed in the inner race 20. The element 24 may be the leg of a table or a chair, or the like. The particular means employed for securing the bolt 25 to the element 24 is not part of the present invention and for that reason, is not described in detail.

Figure 4:
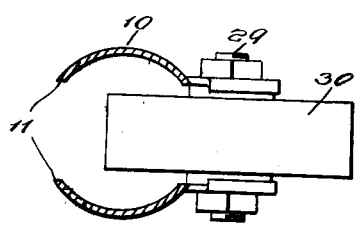
Fig. 4 is a section taken on line 4—4 of Fig. 1.

Referring to Fig. 4, it will be noted that the side members 11 are preferably arcuate in cross section and that they are flattened at their lower ends, the flattened lower ends being provided with slots 28 to accommodate a bolt or axle 29 upon which a wheel 30 is rotatably journaled, a plurality of ball bearings (not shown) being preferably disposed intermediate the axle 29 and the wheel 30 to form an anti-friction bearing for the wheel.

It will be noted that the structure of my improved caster resembles the structure of the caster shown and described in U. S. Letters Patent 1,602,919 issued October 12, 1926. However, the caster shown in the present application differs in construction from the caster shown in Patent 1,602,919 in that the bracket or fork is provided with an undercut recess or cup-shaped member in its upper end, the undercut recess being formed by the arcuate portions 17 of the side members 11 and by the arcuate flanges 15 which form continuations of the arcuate portions 17. Of course, it is readily understood that I preferably form the forks 10 by stamping them from sheet metal and that before the arcuate portions 17 and the flanges 15 are given their final form, the ball bearings 19 are positioned against the under surface of the cross piece or flange 12, the portions 17 and the flanges 15 being then shaped to conform to the outer surface of the outer race 18 by any suitable means such as dies.

Having thus described my invention, it is obvious that various immaterial modifications may be made in the same without departing from the spirit of my invention; hence I do not wish to be understood as limiting myself to the exact form, construction, arrangement and combination of parts herein shown and described, or uses mentioned.

What I claim as new and desire to secure by Letters Patent is:

In a caster, a bracket formed with spaced legs connected across their upper ends by a cross piece, an anti-friction bearing device seated against the under surface of said cross piece and held in place by indented portions of said legs, and a wheel carried by said legs.

In testimony whereof, I have hereunto signed my name.

WILLIAM A. MATHESON.